US012783711B2

(12) United States Patent
Yang

(10) Patent No.: US 12,783,711 B2
(45) Date of Patent: Nov. 3, 2026

(54) METHODS AND SYSTEMS FOR MANAGING DATA IN A DATABASE MANAGEMENT SYSTEM

(71) Applicants: Lemon Inc., Grand Cayman (KY); Beijing Volcano Engine Technology Co., Ltd., Beijing (CN)

(72) Inventor: Xinying Yang, Beijing (CN)

(73) Assignees: Lemon Inc., Grand Cayman (KY); Beijing Volcano Engine Technology Co., Ltd., Beijing (CN)

( * ) Notice: Subject to any disclaimer, the term of this patent is extended or adjusted under 35 U.S.C. 154(b) by 122 days.

(21) Appl. No.: 18/541,695

(22) Filed: Dec. 15, 2023

(65) Prior Publication Data

US 2024/0111889 A1 Apr. 4, 2024

(51) Int. Cl.
*G06F 21/62* (2013.01)

(52) U.S. Cl.
CPC .. *G06F 21/6227* (2013.01); *G06F 2221/2101* (2013.01); *G06F 2221/2113* (2013.01); *G06F 2221/2141* (2013.01)

(58) Field of Classification Search
CPC ......... G06F 21/6227; G06F 2221/2101; G06F 2221/2113; G06F 2221/2141; G06F 16/21; G06F 16/2282; G06F 16/2455; G06F 21/64
See application file for complete search history.

(56) References Cited

U.S. PATENT DOCUMENTS 8,332,740 B2 * 12/2012 Graham ............... G06Q 50/184 715/255
2015/0356111 A1 * 12/2015 Kalsi .................... G06F 16/178 707/610
2019/0236168 A1 * 8/2019 Vaswani ............. G06F 16/2358
2020/0242122 A1 * 7/2020 Beuch ............... G06F 16/24578
2022/0197900 A1 * 6/2022 Maheshwari ............ G06N 3/09
2025/0086181 A1 * 3/2025 Sun ..................... G06F 16/2219

OTHER PUBLICATIONS

Yang et al., “LedgerDB: A Centralized Ledger Database for Universal Audit and Verification”, Proceedings of the VLDB Endowment, vol. 13, No. 12, pp. 3138-3151.
Yang et al., “Ubiquitous Verification in Centralized Ledger Database”, 2022 IEEE 38th International Conference on Data Engineering (ICDE), Kuala Lumpur, Malaysia, 2022, pp. 1-14.
Yang et al., “VeDB: A Software and Hardware Enabled Trusted Relational Database”, Proc. ACM Manag. Data, vol. 1, No. 2, Article 194. Publication date: Jun. 2023, 27 page provided.

* cited by examiner

*Primary Examiner* — Fatoumata Traore
*Assistant Examiner* — Carlton Johnson
(74) *Attorney, Agent, or Firm* — Fish & Richardson P.C.

(57) ABSTRACT

Methods and systems for providing a tamper-resistant database management system. The method including storing data in a temporal table in the database management system provided in a secure processing enclave, in which the temporal table includes a current table and a historical table for storing the data; assigning the stored data in both the current table and historical table, respectively, a unique number; and executing an operation provided in a database query language (DQL) statement for at least one of the stored data in the temporal table. The executing the operation including locating the at least one of the stored data in at least one of the current table or the historical table based on the unique number; and executing the operation on the at least one of the stored data.

20 Claims, 5 Drawing Sheets

METHODS AND SYSTEMS FOR MANAGING DATA IN A DATABASE MANAGEMENT SYSTEM

FIELD

The embodiments described herein pertain generally to methods and systems for managing data in a database. More specifically, the embodiments described herein pertain to managing data in a tamper-resistant database management system (DBMS) that is provided in a secure processing enclave, e.g., in a trusted execution environment (TEE).

BACKGROUND

Data management systems with tamper resistance and non-repudiation functionalities are emerging, in which the data management systems may include ledger database systems that may have blockchain-like features, e.g., tamper proof to prevent database records falsification and includes auditability. For example, software-enabled verifiable database (S-VDB) systems, i.e., ledger databases, provide tamper resistance and non-repudiation functionalities in a centralized architecture. Most of the ledger databases, however, focus on data-oriented verifiable mechanisms such as authenticated data structures (ADS), in which a piece of data would be computed into a hash digest, which can be verified by the ADS computation afterwards. The ledger databases may support query-oriented verifiability or structured query language operations, but neither are well supported in the ledger database systems.

Data management systems may also use conventional hardware-enabled verifiable databases (H-VDB) which focus on data-oriented verifiability. However, the performance of the H-VDB is lower than S-VDB for the overhead of a TEE signature at least in part due to the significant input/output (I/O) cost between the enclave and the DBMS. Due to the constraint of the memory limitation in the TEE, conventional H-VDB systems may use a partially hardware encrypted (P-HE) architecture that shares client-side private keys, e.g., using Remote Attestation (RA) mechanisms and registers authenticated DBMS operator code within the enclave, which may use large amounts of calls between the enclave and the DBMS. Once a cipher-text from an end (e.g., a user end, etc.) is delivered (e.g., through the DBMS, etc.) to the enclave, the enclave first decrypts the cipher-text to the plaintext, performs computations or operations on the plaintext, and then encrypts the computed plaintext (if needed) before replying to the DBMS.

Typically, P-HE databases are designed based on the constraint of the enclave, e.g., the constraint of the trusted execution environment (TEE) memory limitation or restrictions. Therefore, it may be impractical to authenticate the entire DBMS into an enclave to achieve a fully hardware encrypted (F-HE) database system for runtime execution. The input/output (I/O) cost in the P-HE database between the enclave and the DBMS may affect the system performance significantly.

SUMMARY

Recent emergence of increased TEE memory may enable an F-HE architecture. Features in the embodiments disclosed herein may provide an "in-enclave" (i.e., F-HE) database management system (e.g., a relational database management system, etc.) to support the data privacy-preserving and verifiable functionalities by residing the entire DBMS (or the entire database system) into the TEE (e.g., a secure processing enclave, e.g., the TEE memory, etc.).

Features in the embodiments disclosed herein may further relate to a database management system that is provided to serve all trusted applications that require auditability, high efficiency data performance, and/or query verifiability by utilizing TEE-endorsed advanced temporal tables, which significantly enhances conventional ledger database serviceability. In some embodiments, the temporal tables may be used in a verifiable database, in which the temporal tables meet privacy rights or regulation requirements, such as, General Data Protection Regulation (GDPR 2016), and resolve storage overhead limitations of immutable tables. For example, in an in-enclave architecture, the TEE-endorsed temporal table may be tamper-resistant, e.g., not modifiable by adversaries, e.g., unauthorized users that are not a designated user that have restricted rights and/or privileges to the data, based on the DBMS being entirely stored or provided in the enclave, which was not previously possible due to memory limitations of prior TEE systems. Furthermore, the advanced temporal tables may utilize unique numbers, such as, serial numbers, for locating data in the temporal tables for execution of certain operations. The execution of certain operations may also be recorded in an audit table for auditability, e.g., recording meta data corresponding to the operation. Moreover, since the advanced temporal tables are TEE-endorsed, e.g., provided in the secure processing enclave, the temporal table may be natively tamper-resistant.

In some embodiments, the DBMS may be a relational database in which transactions may be defined using a database management programming language such as a database query language (DQL), such as, structured query language (SQL). Database operations may be executed using commands in the form of DQL statements submitted to a messaging interface or front end that is designed, programmed, or otherwise configured to process the DQL statements to allow certain operations to occur for instigating the data in the database(s) in the DBMS, e.g., database transactions.

In one example embodiment, a method for providing a tamper-resistant database management system is provided. The method including storing data in a temporal table in the database management system provided in a secure processing enclave, in which the temporal table includes a current table and a historical table for storing the data; assigning the stored data in both the current table and historical table, respectively, a unique number; and executing an operation provided in a database query language (DQL) statement for at least one of the stored data in the temporal table. The step of executing the operation includes locating the at least one of the stored data in at least one of the current table or the historical table based on the unique number; and executing the operation on the at least one of the stored data.

In another example embodiment, a non-transitory computer-readable medium having computer-executable instructions stored thereon is provided. The computer-executable instructions, upon execution, cause one or more processors to perform operations including storing data in a temporal table in the database management system provided in a secure processing enclave, in which the temporal table includes a current table and a historical table for storing the data; assigning the stored data in both the current table and historical table, respectively, a unique number; and executing an operation provided in a database query language (DQL) statement for at least one of the stored data in the temporal table. The executing the operation includes locating the at least one of the stored data in at least one of the current table or the historical table based on the unique number; and executing the operation on the at least one of the stored data.

In yet another example embodiment, a tamper-resistant database management system is provided. The database management system including a processor configured to execute instructions and a temporal table for storing data. The temporal table including a current table and a historical table for storing the data, in which both the current table and historical table include a unique number assigned to the stored data, respectively. The processor is configured to execute the instructions, which when executed, cause the processor to: execute an operation provided in a database query language (DQL) statement for at least one of the stored data in the temporal table. The executing the operation includes locating the at least one of the stored data in at least one of the current table or the historical table based on the unique number; and executing the operation on the at least one of the stored data. The tamper-resistant database management system is provided in a secure processing enclave.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
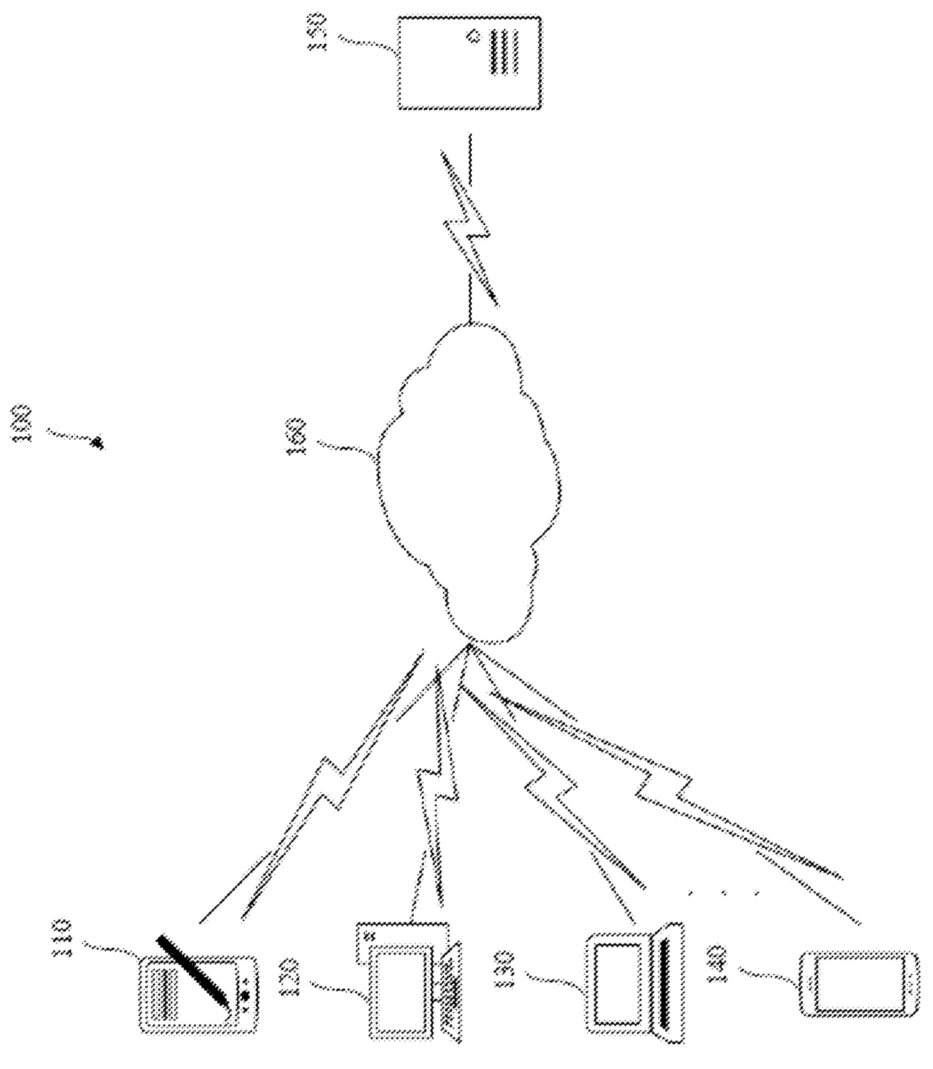
FIG. 1 is a schematic view of an example network for a tamper-resistant database system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "database" is a term of art and may refer to an organized collection of data or a type of data store based on the use of a database management system (DBMS), the software that interacts with end users, applications, and the database itself to capture and analyze the data. As referenced herein, a "database server" is a term of art and may refer to a server which uses a database application that provides database services to other computer programs or to computers, as defined by the client-server model. It is to be understood that some DBMS typically provides database-server functionality, and that some DBMS may rely exclusively on the client-server model for database access. It is also to be understood that the DBMS may additionally encompasses the core facilities provided to administer the database, and that the sum total of the database, the DBMS, and the associated applications may be referred to as a database system. In an example embodiment, the database system may be a relational database system equipped with the option of using a Database Query Language (DQL), such as, Structured Query Language (SQL), for querying and updating the database. It is further to be understood that a database may include one or more database tables, every column of a database table represents a particular variable or field, and each row of the database table corresponds to a given record or entry. The table may list values for each of the variables or fields, and/or for each record or entry.

As referenced herein, a "database management system" (DBMS) is a term of art that may refer to a computer program or set of computer programs for creating and managing databases. The DBMS may be executed on one or more processor enabled-devices, such as, central processing units (CPUs), graphic processing units (GPUs), accelerators, etc., in a database system. A DBMS may allow interactions with database(s) managed by the DBMS to perform operations such as data creation, erasure, hiding, querying, and control.

As referenced herein, a "DBMS engine" or a "database engine" is a term of art that may refer to the software or algorithm(s) in a database system that recognizes and interprets database commands (e.g., SQL commands, etc.) to access a database and interrogate or instigate data in the database. In an example embodiment, a DBMS engine may include an SQL engine (or an SQL query engine).

As referenced herein, an "enclave" is a term of art that may refer to a trusted execution environment (TEE) that may protect sensitive data and code, e.g., from attackers that control, attempt to control, or have otherwise compromised the operating system and the hypervisor on a host machine. It is to be understood that an enclave or TEE may refer to a set of system resources (e.g., memory, input/output, processors such as central processing units, etc.) that operate in a common security domain and that share the protection of a single, common, continuous security perimeter. In an example embodiment, an enclave or TEE may refer to a private regions of memory designed to be protected from processes running at higher privilege levels. It is also to be understood that an enclave or TEE may refer to a secure area to help code and data loaded inside it to be protected with respect to confidentiality and integrity. Data integrity prevents unauthorized entities from outside the enclave or TEE from altering data, while code integrity prevents code in the enclave or TEE from being replaced or modified by unauthorized entities, which may also be the computer owner itself. This may be done by implementing confidential architectural security which offers hardware-based memory encryption that isolates specific application code and data in memory. An enclave or TEE may be an isolated execution environment that provides security features such as isolated execution, integrity of applications executing with the enclave or TEE, along with confidentiality of their assets. That is, the enclave or TEE may offer an execution space that provides a higher level of security for trusted applications running on the device than an operating system.

As referenced herein, a "fine-grained" or "granular" data privacy preservation is a term of art and may refer to a method, program, or system of preserving data privacy with respect to a certain portion of data or a certain aspect of data. In an example embodiment, a fine-grained data privacy preservation database may refer to a database that provides a fine-grained data privacy preservation mechanism e.g., to protect data privacy of one or more columns/fields (and/or one or more rows/records) of a database table. In contrast, a "coarse-grained" data privacy preservation is a term of art that may refer to a method, program, or system of preserving data privacy for generalized data privacy control. In an example embodiment, a coarse-grained data privacy preservation database may refer to a database that provides a coarse-grained data privacy preservation mechanism e.g., to protect data privacy of an entire database table (e.g., based on a user's role or permission, etc.) instead of a certain portion of the database table or a certain aspect of the database table.

As referenced herein, a "data" or "dataset" is a term of art that may refer to an organized collection of data that is capable of being stored and accessed electronically. In an example embodiment, a data may refer to a database, a data table, a portion of a database or data table, etc. It is to be understood that data may correspond to one or more database tables, of which every column of a database table represents a particular variable or field, and each row of the database table corresponds to a given record of a dataset. The data may list values for each of the variables, and/or for each record of the data. It is also to be understood that a dataset may also or alternatively refer to a set of related data and the way the related data is organized. In an example embodiment, each record of a dataset may include field(s) or element(s) such as one or more predefined or predetermined identifications (e.g., user identifications, such as user's name, e-mail address, phone numbers, user's unique ID, etc.), and/or one or more attributes or features or values associated with the one or more identifications.

As referenced herein, "metadata" may refer to descriptive information about the data, or "data about the data." Metadata may carry individual traits pertaining to the operation and/or information about the data, such as, operation type, executor of the operation, a number of the affected data, timestamps, etc.

As referenced herein, a "temporal table" is a term of art that may refer to database features that bring built-in support for providing information about data stored in the table at any point in time, such as, meta data. The temporal tables may be used to track the history of data changes. In some embodiments, the temporal table may include a current table that stores current data, e.g., most up-to-date data, such as, data of current relevance or that may be used by the owner of the data or designated user, and a historical table that contains the obsolete data, e.g., deleted or changed data.

As referenced herein, a "tamper-resistant" or "tamper-resistance" system may refer to a system in which the data is only accessible, e.g., viewable, selectable, and/or fetchable, and/or modifiable by a designated user, such as, an owner of the data or someone designated or allowed to access and/or modify the data by the owner of the data, e.g., a system administrator or trusted-third party. That is, adversaries, e.g., users other than designated users, are restricted and therefore unable or prevented from viewing, modifying, and/or accessing the data in the tamper-resistant database management system, e.g., since the DBMS is in a secure processing enclave, adversaries are not able to change or modify the data. "Tamper-resistant" or "tamper-resistance" may also refer to a verification process in which a signature may be used to verify the integrity of the resultset data, e.g., verify that the data is not tampered with, or may be used to verify the designated user.

While prior database management systems have poor performance and the inability to reduce storage overhead, which results in a large amount of storage consumption, the methods, programs, and systems as discussed herein are provided to serve trusted applications that require auditability, high efficiency data performance, and/or query verifiability by utilizing TEE-endorsed advanced temporal tables, which significantly enhance conventional ledger database serviceability. In some embodiments, the temporal tables may be used in a verifiable database, in which the temporal tables meet privacy rights or regulation requirements, such as, General Data Protection Regulation (GDPR 2016), and resolve storage overhead limitations of immutable tables. For example, in an in-enclave architecture, the TEE-endorsed temporal table may be tamper-resistant, e.g., not modifiable by adversaries, e.g., unauthorized users that are not a designated user that have restricted rights and/or privileges to the data, based on the DBMS being entirely stored or provided in the enclave, which was not previously possible due to memory limitations of prior TEE systems. Furthermore, the advanced temporal tables may utilize unique numbers, such as serial numbers, for locating data in the temporal tables for execution of certain operations. The execution of certain operations may also be recorded in an audit table for auditability, e.g., recording meta data corresponding to the operation. Moreover, since the advanced temporal tables are TEE-endorsed, e.g., provided in the secure processing enclave, the temporal table may be natively tamper-resistant.

In some embodiments, the DBMS may be a relational database in which transactions may be defined using a database management programming language such as a structured query language (SQL). Database operations may be executed using commands in the form of SQL statements submitted to a messaging interface or front end that is designed, programmed, or otherwise configured to process the SQL statements to allow certain operations to occur for instigating the data in the database(s) in the DBMS, e.g., database transactions.

FIG. 1 is a schematic view of an example network for a tamper-resistant database management system, which may provide auditability, high efficiency data performance, and/or query verifiability.

The system 100 may include terminal devices 110, 120, 130, and 140, a network 160, and/or a server 150. It is to be understood that the server 150 may be a database server that provides database services to other computer programs or to computers, as defined by a client-server model. The terminal devices 110, 120, 130, and 140 may be the device(s) used to query (or operate, e.g., analyze, process, use, store, share, access, etc.) the database on or from the server. It is also to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices. The terminal devices 110, 120, 130, and 140 may be client devices that include an application (or application programing interface (API) connection), such as SQL clients and/or verification APIs, web-accessing program, e.g., browser, or other Internet enabled program for accessing the data management system on the server 150 for instigating database transactions with the server 150. The terminal devices 110, 120, 130, and 140 may also include security programs, access keys, certificates, signatures, encryption programs, or the like to be able to access the server 150.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server that includes a database management system (DBMS) provided in an enclave or secure processing enclave, e.g., a TEE that may protect data and code from adversaries or attackers. The DBMS may include a front end for communicating with the terminal devices 110, 120, 130, 140 and may receive the inputs from the terminal devices for processing. The inputs may be requests for transactions or instigation of a database(s) managed by the DBMS. The requests may contain commands in the form of database query language (DQL), such as, SQL statements, which define database transactions to be executed on the database(s) in which the DQL statements may be processed by the front end. The DBMS may include a set of designated users who may be authorized to perform operations on the database(s). A user may be assigned one or more roles, which in turn may be associated with one or more permissions, or a user may be associated with one or more permissions directly. The permissions associated with a user (directly or indirectly) specify what operations the user is and is not authorized to instigate in relation to the database(s). Unauthorized users (or users that are not designated users) may be considered adversarial parties that may attempt unauthorized access to the data, e.g., who may try to tamper with the data. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces, e.g., SQL clients, thereof may be installed on the terminal devices 110, 120, 130, and 140. The user may be a client device for sending inputs, such as SQL statements, for instigating the database.

It is further understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
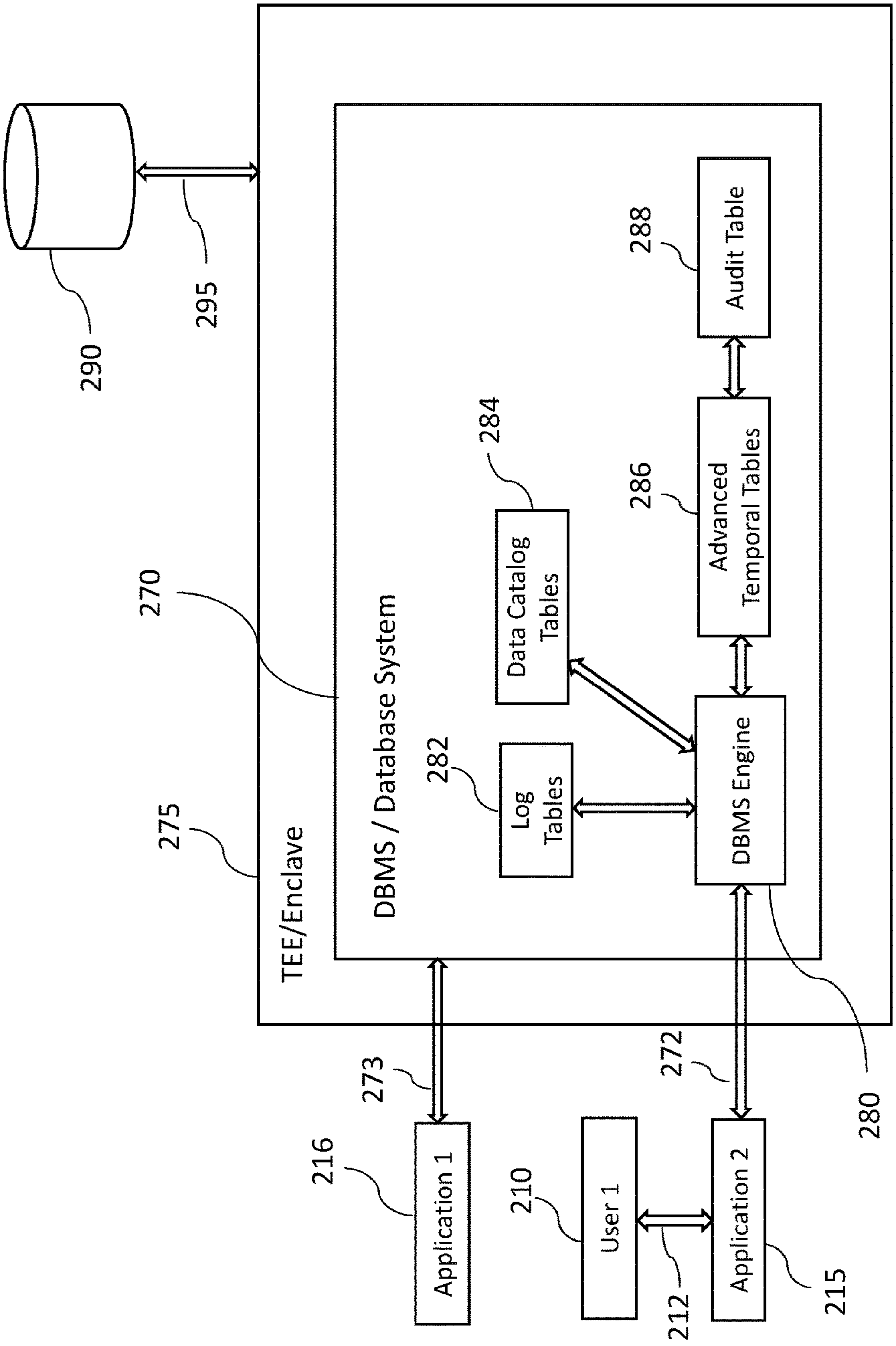
FIG. 2 is a schematic view of an architecture for a database system, in accordance with at least some embodiments described herein.

FIG. 2 is a schematic view of an architecture for a DBMS 270, according to an example embodiment. The DBMS 270 may be a virtual machine executed on a processor-enabled server and/or multiple servers provided over a cloud computing network or infrastructure, for example, for video and content distribution and/or data processing. In an example embodiment, the DBMS 270 may reside entirely in a secure processing enclave 275. The enclave 275 may be a trusted execution environment (TEE), which may be a set of encrypted system resources (e.g., memory, input/output, processors such as central processing units, graphics processing units, secure hardware, secure software, etc.). The DBMS 270 may include DBMS engine 280. In some embodiments, the secure processor in the enclave may also be in communication with unsecure database(s), e.g., provided outside the enclave 275, e.g., the TEE.

In an example embodiment, the DBMS engine 280 may be a DQL engine, such as, a SQL engine. The DBMS engine 280 may be designed, programmed, or otherwise configured to receive database commands (e.g., SQL statements, etc.) from a user 210 via application(s) 215, to generate/create or operate/access/manipulate one or more database tables 282, 284, and/or communicate with or control one or more tools or processes, such as, a log manager. That is, the DBMS engine 280 may be designed, programmed, or otherwise configured to execute within the enclave 275 any received DQL statements and has access to storage database 290. The DBMS engine 280 may parse the DQL statement which may include a request to read selected data stored in the secure storage database 290, to write data to the secure storage database 290, or to amend data stored in the secure storage database 290. In some embodiments, the DQL statement may further include instructions or operations to erase or hide data stored in temporal table 286 which may be audited by data, e.g., metadata, stored in an audit table 288 paired with the temporal table 286.

In an example embodiment, the one or more database tables 282, 284 may be loaded e.g., by the DBMS 270 to the enclave 275 from the storage 290 via an encrypted channel 295 such as e.g., a trusted execution environment-input/output transport layer security (TEE-IO TLS) channel, etc. In an example embodiment, the one or more database tables 282, 284 may be saved in, stored in, or sent to the storage 290 from the enclave 275, e.g., by the DBMS 270 via the encrypted channel 295. In some embodiments, the one or more database tables 282, 284 may include system tables such as system catalog table(s), ledger table(s), user defined/generated table(s), log table(s), visibility catalog(s), digest table(s), or any other suitable database tables, views, etc., that include data that may be arranged in rows and columns to represent relations of data stored in the database(s) 290 and access rights to the data by users. In some embodiments, the one or more database table(s) 282, 284 may be defined by the DBMS 270 and/or user, such as designated users, with trusted features, e.g., via data definition language (DDL). Once the one or more database table(s) 282, 284 are defined, the one or more database table(s) 282, 284 may further include temporal table(s) 286, in which the temporal table(s) 286 may include a current table and a historical table which are paired with an audit table 288. The temporal table 286 and/or audit table 288 may contain metadata to support efficient data and query verifiability for the data stored in the database(s), e.g., for accessing, auditing, and/or verifying any targeted stored data. In some embodiments, the stored data in the temporal tables are only accessible and/or modifiable by a designated user, i.e., restricted to such designated user for access and/or modification.

In an example embodiment, the user 210 may run the application 215 on a client device such as the terminal device 110, 120, 130, and 140 of FIG. 1 and/or the server 150 of FIG. 1. The client device may include an application (or application programing interface (API) connection), such as SQL clients and/or verification APIs, web-accessing program, e.g., browser, or other Internet enabled program for accessing the data management system 270, e.g., for instigating database transactions with the DBMS and/or server. The client device may also include security programs, access keys, encryption programs, or the like to be able to access the server and/or the DBMS 270.

The user 210 may be a designated user, such as, the owner of the database, a database administrator (DBA), an authorized user given rights to access and/or modify the data in the database of the database system 270, etc. The user 210 may run the application 215 by e.g., providing input 212 to the application 215 and/or receiving output 212 from the application 215. The application 215 may communicate with the DBMS engine 280 via e.g., secure network connections 272. The application 215 may be a fine-grained privacy-preserving application, a tamper-resistant application, or any other suitable application(s).

In an example embodiment, a user (not shown), who may or may not be user 210, may run the application 216 on a device such as the terminal device 110, 120, 130, and 140 of FIG. 1 and/or the server 150 of FIG. 1. This user may also be a designated user, such as, the owner of the database, a database administrator (DBA), an authorized user given rights to access and/or modify the database of the database system 270, etc. The application 216 may communicate with the DBMS 270 (and/or the DBMS engine 280) via e.g., secure network connection(s) 273. The application 216 may be a coarse-grained privacy-preserving application any other suitable application(s).

Figure 3:
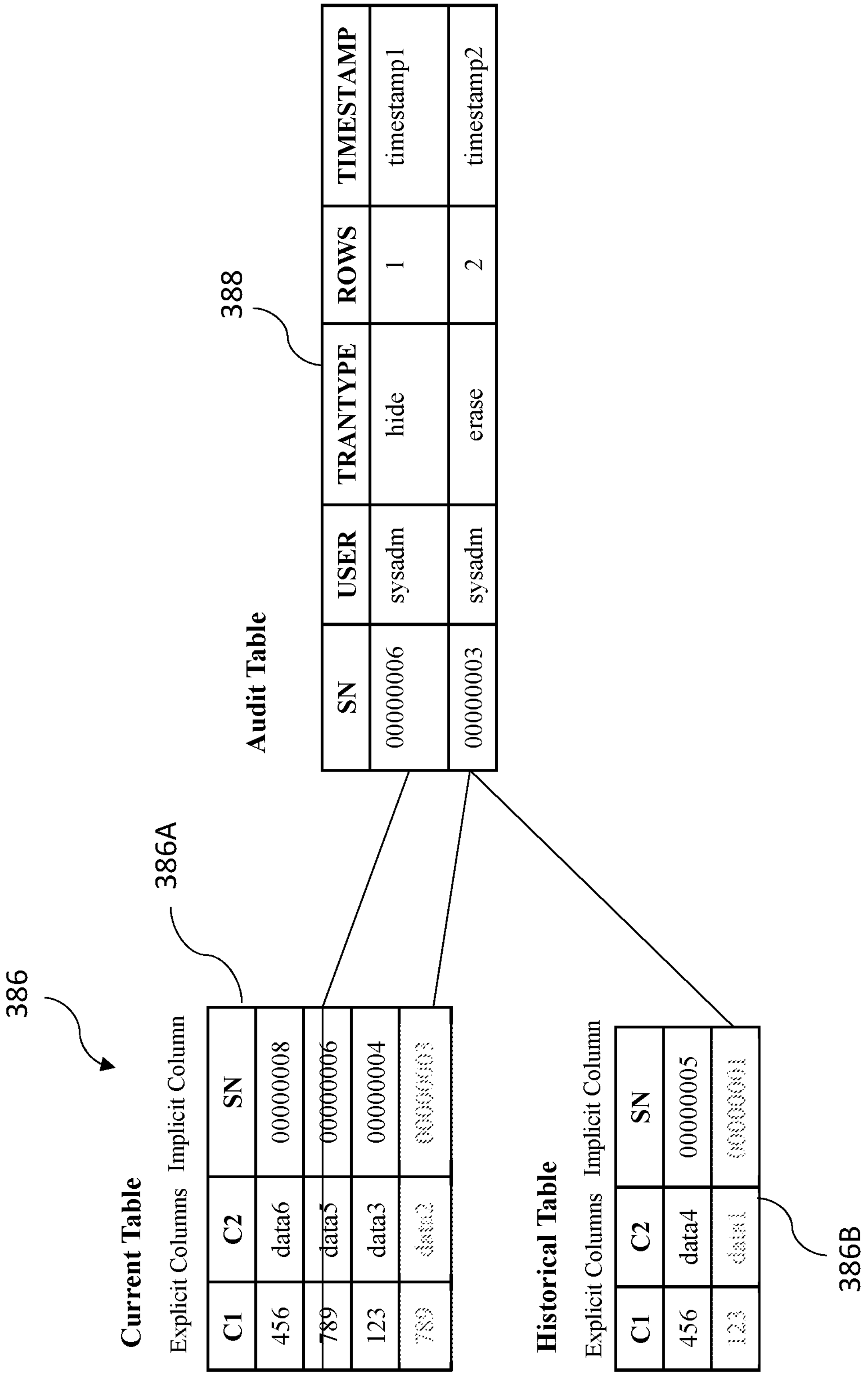
FIG. 3 is a schematic diagram illustrating an example operation of a database management engine, in accordance with at least some embodiments described herein.

FIG. 3 is an example embodiment of an operation of a DBMS, e.g., 270 of FIG. 2, using a temporal table 386 and audit table 388 to support blockchain-like tamper-resistant functionality, and may further be used to resolve storage overhead limitations and support efficient data and query verifiability that meet data privacy right requirements, according to an embodiment. The temporal table 386 and the audit table 388 may include any of the features of the temporal table(s) and/or audit table(s), as discussed herein, such as, temporal table 286 and audit table 288.

In some embodiments, the DBMS may include a DBMS engine, e.g., 280. The DBMS engine may be a DQL engine, such as, a SQL engine, and may be designed, programmed, or otherwise configured to receive database commands (e.g., SQL statements, etc.) from a user, e.g., 210, via application (s), e.g., 215, to generate/create or operate/access/manipulate one or more database tables, e.g., 282, 284, and/or communicate with or control one or more tools or processes. That is, the DBMS engine may be designed, programmed, or otherwise configured to execute within the enclave any received DQL statements and has access to storage database, e.g., 290. The DBMS engine may parse the DQL statement which may include a request to read selected data stored in the secure storage database, to write data to the secure storage database, or to amend data stored in the secure storage database. In some embodiments, the DQL statement may further include instructions or operations to erase or hide data stored in the temporal table 386 which may be audited by data in the audit table 388 paired with the temporal table 386. In some embodiments, the DQL statement may include a verification that the user is a designated user by using a signature confirmation, e.g., a SQL statement that includes "WITH SIGNATURE," to confirm that the user has a high-privilege role for accessing, modifying, or selecting certain data using the operation and/or for the user to verify that the table data and query resultset are not modified, e.g., TEE-endorsed resultset.

In some embodiments, the one or more database table(s) may be defined by the DBMS with trusted features, e.g., via data definition language (DDL). Once the one or more database table(s) are defined, the one or more database table(s) may further include the temporal table(s) 386. The temporal table(s) 386 may include a current table 386A and a historical table 386B which are paired with the audit table 388, for storing data corresponding to the data stored in the storage database. The current table 386A may store current data, e.g., most up-to-date data, while the historical table 386B may store old data, e.g., obsolete or changed data, for example, from the current table 386A. The temporal table 386 and/or audit table 388 may contain metadata to support efficient data and query verifiability for the data stored in the database(s), e.g., for accessing, auditing, and/or verifying any target data, e.g., stored data, while maintaining the auditability of the entire temporal table, e.g., to have blockchain-like tamper-resistant functionality and/or immutability.

In some embodiments, the temporal tables 386 may include an implicit column for a unique number, which may be used as an identifier for the stored data and may be used as a unique searching key, so the unique number may not be necessarily monotonic, which may reduce overhead transaction processing by providing efficient data and query processing functionalities. That is, while conventional temporal tables may be designed as immutable tables containing timestamp information, in which stored data may be retrieved by timestamp filters, the unique number in the temporal tables 386 may allow for advanced functionalities by providing a unique searching key for targeted searching of stored data, such that the stored data may be located and queried efficiently, while maintaining auditability of the stored data. As such, the temporal tables 386 have advanced functionalities, for example, by using the unique numbers that may be used to locate stored data to allow for data erasure of one or more stored data, e.g., data stored before a certain timestamp, and to hide data to meet the regulatory compliance for data privacy protection. In some embodiments, the unique number may be a serial number that is monotonically incremental and associated with the stored data, but the unique number does not necessarily have to be sequential, e.g., holes or gaps in the incremental number may be present, e.g., unique numbers may include 1, 3, 4, 5, 6, in which 2 is missing.

Referring back to FIG. 3, in an example embodiment of an operation of the DBMS engine, e.g., 280, the DBMS engine may be designed, programmed, or otherwise configured to execute within the enclave any received DQL statements. The DBMS engine may parse the DQL statement which may include instructions, statements, or operations for execution, such as, erase data, e.g., to reduce storage overhead, fetch data, select data, or hide data, e.g., for data privacy and protection, stored in the temporal table 386. In some embodiments, the instructions, statements, or operations may be audited using the audit table 388 to maintain a record trail.

For example, in some embodiments, to resolve the storage overhead problem, e.g., memory limitations of the TEE, the user, e.g., 210, may request targeted data to be deleted from the TEE, e.g., from one or more of the current table 386A or the historical table 386B. In some embodiments, the user may send a DQL statement to the DBMS engine in which an erase operation may be parsed from the DQL statement for erasing or deleting data, e.g., data stored before a certain timestamp. The erase operation may be an operation that specifies the erase or delete operation for targeted stored data associated with the unique number. In some embodiments, the erase operation may be a SQL statement that includes a "DELETE" statement or may be implicitly provided by a "not greater than or equal to" keyword or predicate or "<=" keyword or predicate in the "DELETE" statement, in which the DQL statement may specify the target unique number and/or any monotonically decreasing unique numbers for deletion. In some embodiments, the DQL statement may be designated as: "DELETE FROM T WHERE sn<=?" For example, if the "DELETE" statement includes the "not greater than or equal to" keyword or predicate for unique number "00000003," then the data1 and data 2 associated with unique number "00000003" and the unique number(s) below this value, e.g., "00000001", would be erased from the current table 386A and the historical table 386B.

In some embodiments, to provide data privacy, e.g., information or data relating to the owner that should not be public, e.g., salary, phone numbers, social security numbers, address, etc., the user, e.g., 210, may request stored data to be hidden, e.g., in one or more of the current table 386A or the historical table 386B. In some embodiments, the user may send a DQL statement to the DBMS engine in which the hide statement may be parsed from the DQL statement to hide any target data. In some embodiments, the hide statement may be a SQL statement or may be implicitly provided by an "equal to" predicate or "=" predicate on the "DELETE" statement, in which the DQL statement may specify the target unique number. For example, the DQL statement may be designated as: "DELETE FROM T WHERE sn=?" For example, if the "DELETE" statement includes the "equal to" keyword or predicate for unique number "00000006," then the data5 associated with unique number "00000006", would be hidden in the current table 386A. That is, in some embodiments, the "DELETE" statement may be used for both the erase or delete operation and/or the hide operation, depending on the predicate on the "DELETE" statement.

In some embodiments, only those with high-privileged roles, e.g., authorized users, may be authorized to execute any operation on the stored data, e.g., the "DELETE" statement with such predicate, e.g., to access and/or modify the data. For example, in some embodiments, the high-privileged roles of designated users may be verified when the DQL statement includes a signature request, e.g., "WITH SIGNATURE" statement. As such, the DBMS engine may be programmed, designed, or otherwise configured to verify the user as being a designated user with high-privilege, e.g., via certificate or storage of designated users in catalogs stored in the DBMS, to allow the execution of the operation on the stored data. While the "DELETE" statement has been discussed herein, such disclosure is not intended to be limiting. Rather, other statements may also be used to provide the intended operation, e.g., hide statement.

In some embodiments, in order to maintain blockchain-like tamper-resistant features, e.g., immutable like features, for data on the DBMS, the audit table 388 may be pairwise provided with the temporal table 386 such that any changes to the data in the temporal table 386 is recorded or stored in the audit table 388. The audit table 388 may include one or more data information, such as, metadata, corresponding to the target stored data for recording or storing the changes to the targeted stored data. The one or more data information may include the executor of the operation, e.g., the user who requested the operation, the operation type, the specified value of the unique number, number of rows affected, the timestamp, or the like. In some embodiments, the audit table 388 may only be created and used after an erase operation or hide operation.

For example, as illustrated in FIG. 3, after the DBMS engine executes a hide operation for unique number "00000006", data5 and associated stored data "789" may be hidden in the current table 386A so that adversaries cannot access, view, or modify data5, e.g., for data privacy protection purposes. As discussed above, data5 may be data relating to personal information of the owner, such as, salary, phone numbers, addresses, social security number, etc. that may be used to identify the owner of the data. After execution of the hide operation, the hidden data may be recorded on the audit table 388 to maintain a record of the hidden data for auditability purposes. In some embodiments, the audit table 388 may include data and metadata, such as, the unique number, e.g., “00000006”, the user, e.g., system administrator (sysadm), the transaction type, e.g., hide, the number of rows affected, e.g., 1, and the timestamp.

In another embodiment, after the DBMS engine executes an erase operation for unique number “00000003”, unique number “00000003” in the current table 386A and unique number “00000001” in the historical table 386B (and associated data2 and data 1) may be erased or deleted to reduce storage overhead in the TEE. After execution of the erase operation, the erased or deleted data may be recorded on the audit table 388 to maintain a record of the erased or deleted data for auditability purposes. In some embodiments, the audit table 388 may include data and metadata, such as, the unique number, e.g., “00000003” (since the erase operation is identified for the unique number and unique numbers below this value), the user, e.g., system administrator (sysadm), the transaction type, e.g., erase, the number of rows affected, e.g., 2 rows are affected corresponding to unique numbers “00000003” and “00000001”, and the timestamp. While the audit table 388 has been discussed herein with respect to certain data and metadata associated with the data, such disclosure is not intended to be limiting. Rather, other types of data information for tracking the stored data may be used, identified, stored, or recorded on the audit table 388 for auditability.

As such, the temporal table 386 and the audit table 388 are configured and/or provided to achieve practical regulatory compliance and overcome storage overhead limitations by providing a constraint predicate on the implicit unique number column to efficiently locate any target data and maintain auditability of the same, e.g., all erased and hidden trails are recorded in the audit table. That is, by at least including the implicit column including the unique number that is monotonically incremental, data may be accessed, located, and/or modified using the unique number as an identifier, e.g., such that the data may be erased or deleted before a certain timestamp, to reduce storage overhead, and/or be used to hide owner or user data for data protection and/or privacy protection, e.g., to meet regulatory compliance, such as GDPR. While the disclosure has been discussed herein with respect to monotonically increasing and/or decreasing, such disclosure is not intended to be limiting. Rather, other algorithms or methods may be used to specifically identify the data to be targeted, for example, using hash algorithms or other algorithms for coordinating and/or associating data with an identifiable value.

Figure 4:
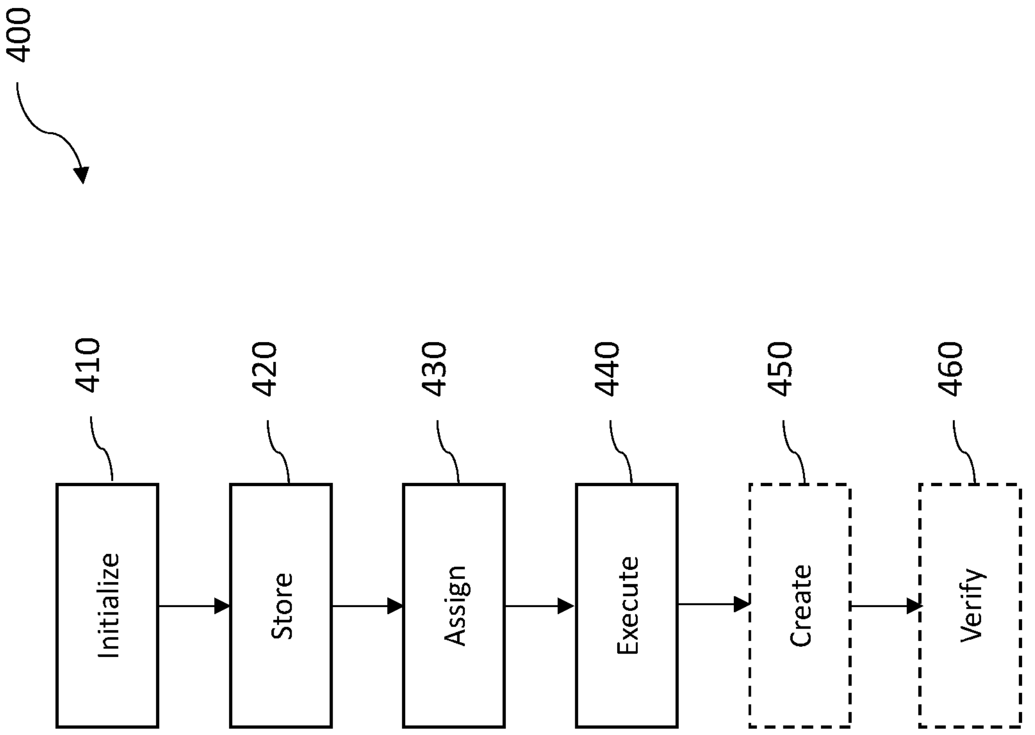
FIG. 4 is a flow chart illustrating an example processing flow for providing a tamper-resistant database system, in accordance with at least some embodiments described herein.

FIG. 4 is a flow chart illustrating an example processing flow 400 for providing a tamper-resistant database management system, in accordance with at least some embodiments described herein.

Figure 5:
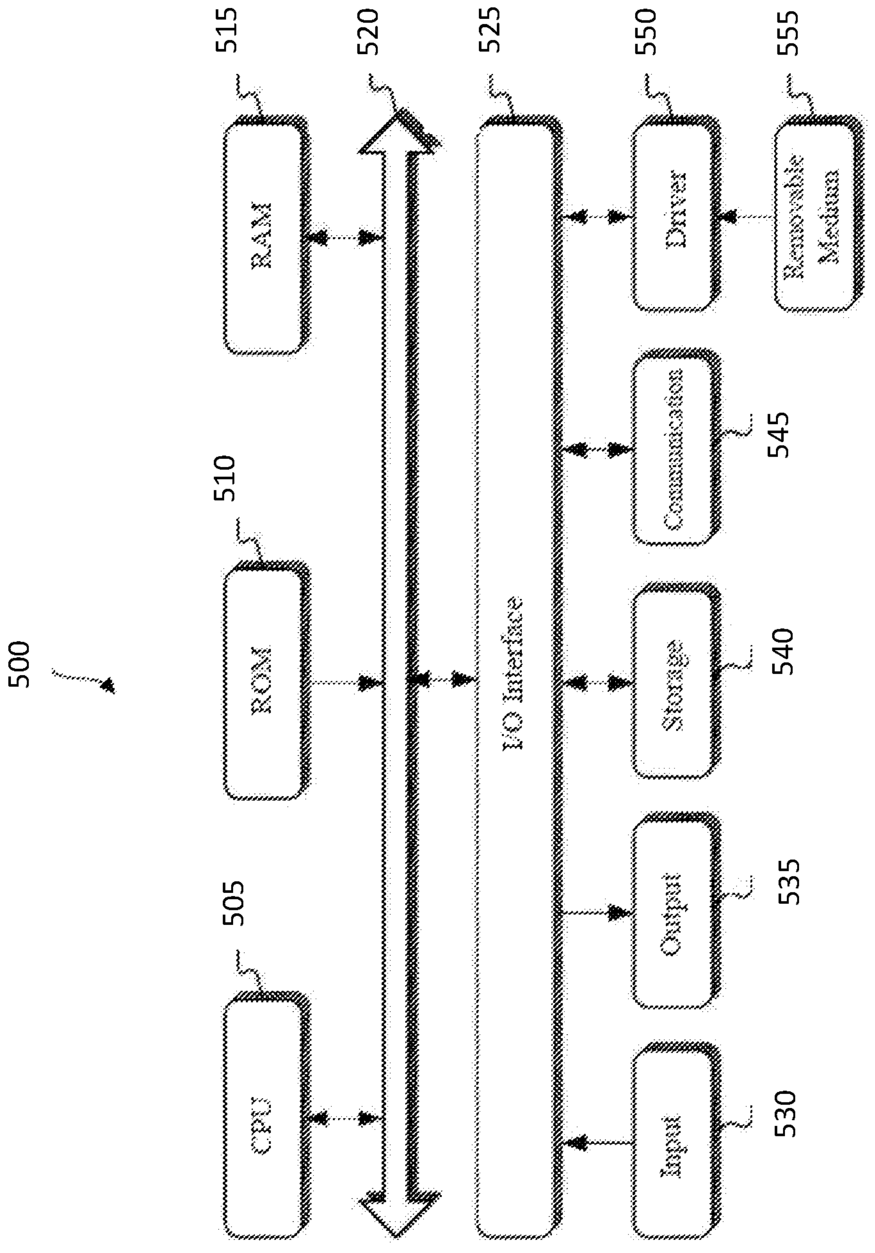
FIG. 5 is a schematic structural diagram of an example computer system applicable to implementing an electronic device, arranged in accordance with at least some embodiments described herein.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, a processor in a DBMS, e.g., DBMS 270 and/or DBMS engine 280 of FIG. 2, the central processor unit 505 of FIG. 5, and/or any other suitable processor), unless otherwise specified.

It is also to be understood that the processing flow 400 can include one or more operations, actions, or functions as illustrated by one or more of blocks 410, 420, 430, 440, 450, and 460. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 400 may begin at block 410.

At block 410 (Initialize), the processor for a respective device may perform initialization functions or operations for, e.g., defining one or more database table(s) in a data management system provided in a secure processing enclave with trusted features, e.g., via data definition language (DDL). Once the one or more database table(s) are defined, a TEE-assisted tamper-resistant table, e.g., temporal table (s), may be defined using the IMMUTABLE keyword with TEE specified, e.g., using a create statement for the table. In some embodiments, the temporal table(s) are created containing an implicit column SN which may be used to store unique numbers, such as, serial numbers, associated or corresponding to stored data in the temporal table(s). The temporal table(s) may be paired with an audit table. The temporal table and/or audit table may contain metadata to support efficient data and query verifiability for the data stored in the database(s), e.g., for accessing, auditing, and/or verifying any target stored data. Processing may proceed from block 410 to block 420.

At block 420 (Store), the processor may store data in the temporal table in the database management system. The temporal table may include a current table and a historical table for storing the data, in which the current table may store current data, while the historical table may store old data or obsolete data. The data may include user identifications, such as a user's name, e-mail address, salary, phone numbers, address, user's unique ID, etc. The data storage may be authorized by a user, who may be a designated user, such as, the owner of the data or someone designated or allowed to access and/or modify the data by the owner of the data, e.g., a system administrator or trusted-third party. Processing may proceed from block 420 to block 430.

At block 430 (Assign), the processor may assign, respectively, the data in both the current table and historical table a unique number. The unique number may be used as an identifier for the stored data and may be used as a unique searching key, so the unique number may not be necessarily monotonic, which may reduce overhead transaction processing by providing efficient data and query processing functionalities. That is, while conventional temporal tables may be designed as immutable tables containing timestamp information, in which stored data may be retrieved by timestamp filters, the unique number in the temporal tables may allow for advanced functionalities by providing a unique searching key for targeted locating of stored data, such that the stored data may be located and queried efficiently, for example, to allow for data erasure before a certain timestamp to reduce storage overhead, and to hide data to meet the regulatory compliance for data privacy protection. In some embodiments, the unique number may be a serial number that is monotonically incremental and associated with the stored data, but the unique number does not necessarily have to be sequential, e.g., holes or gaps in the incremental number may be present, e.g., unique numbers may include 1, 3, 4, 5, 6, in which 2 is missing, etc. Processing may proceed from block 430 to block 440.

At block 440 (Execute), the processor may execute an operation provided in a database query language (DQL) statement for at least one of the stored data in the temporal table. The execution of the operation may include locating the at least one of the stored data in the current table and/or the historical table based on the unique number, and executing the operation on the at least one of the stored data. The operation may include, but not limited, to a hide operation, an erase operation, a fetch operation, a select operation, or the like.

In some embodiments, in order to execute the operation, the processor may verify the user as being a designated user such that the stored data in the temporal table (and/or data in the DBMS) is only accessible and/or modifiable after such verification, e.g., access to and/or modification of data being restricted to the designed user. For example, in some embodiments, during the parsing of the DQL statement, a select statement may be used to identify the TEE and to request verification using a signature, e.g., signature of the user matching a stored designated user, e.g., via certificate, handshake, ID, or the like. For example, the statement may include: "SELECT FROM T WITH SIGNATURE." In some embodiments, the verification may also allow the designated user to verify data integrity of the resultset from a query, e.g., the designated user may check the TEE-endorsed signature in the resultset to ensure the data has not been modified or altered. As such, a tamper-resistant DQL statement may be provided and/or used to further provide tamper-resistant functionality to the DBMS, e.g., by providing a verification between the DBMS and/or the user to access and/or modify the data in the secure enclave and/or the DBMS.

In some embodiments, to resolve the storage overhead limitations, e.g., memory limitations of the TEE, the previously immutable data from blockchain ledger systems may instead be deleted and/or modified by the designated user. For example, in some embodiments, the designated user may send a DQL statement to the DBMS that includes an erase operation that may be parsed from the DQL statement and executed to erase or delete data, e.g., stored data corresponding to a certain timestamp and before the same. The erase operation may be an operation that specifies the erase or delete operation for targeted stored data associated with the unique number. In some embodiments, the erase operation may be a SQL statement that includes a "DELETE" statement or may be implicitly provided by a "not greater than or equal to" predicate or "<=" predicate in the "DELETE" statement, in which the DQL statement may specify the target unique number and/or any monotonically decreasing unique numbers for deletion. In some embodiments, the DQL statement may be designated as: "DELETE FROM T WHERE sn<=?". While the erase operation has been discussed with respect to monotonically decreasing unique numbers, such disclosure is not intended to be limiting. Rather, the erase operation may also target selected stored data, e.g., stored data corresponding to a single unique number.

In some embodiments, to provide data privacy, e.g., information or data relating to the owner that should not be public, e.g., salary, phone numbers, social security numbers, address, etc., the designated user may request targeted stored data to be hidden (or erased), e.g., in one or more of the current table or the historical table. In some embodiments, the user may send a DQL statement to the DBMS engine in which a hide operation may be parsed from the DQL statement for hiding any target data. In some embodiments, the hide operation may be a SQL statement or may be implicitly provided by an "equal to" predicate or "=" predicate on the "DELETE" statement, in which the DQL statement may specify the target unique number. For example, the DQL statement may be designated as: "DELETE FROM T WHERE sn=?" That is, in some embodiments, the "DELETE" statement may be used for both the erase or delete operation and the hide operation, depending on the predicate on the "DELETE" statement. In some embodiments, only high-privileged roles, e.g., designated users, may be authorized to execute the "DELETE" statement with such predicate, e.g., adversaries are restricted to using such statement. While the "DELETE" statement has been discussed herein, such disclosure is not intended to be limiting. Rather, other statements may also be used to provide the intended operation, e.g., hide statement.

Processing may proceed from block 440 to block 450.

At block 450 (Create), the processor may optionally create, after the execution of the operation provided in the DQL statement, the audit table pairwise with the temporal table such that any changes to the data in the temporal table is recorded or stored in the audit table, e.g., create an audit trail for the data. The audit table may include one or more data information, such as, meta data, corresponding to the target stored data for recording or storing the changes to the targeted stored data. The one or more data information may include the executor of the operation, e.g., the user who requested the operation, the operation type, the specified value of the unique number, number of rows affected, and the timestamp. As such, the audit table may be provided to support blockchain-like tamper-resistant functionality for the DBMS, for example, by maintaining a record trail for any changes to the stored data in the temporal table, e.g., due to an erase operation or hide operation. Processing may proceed from block 450 to block 460.

At block 460 (Verify), the processor may optionally send to the designated user the table stored data and query resultset for verification, when the select statement is provided in the DQL statement which specifies the signature requirement. It is appreciated that in an in-enclave architecture, the design of tamper-resistance is entirely different from conventional P-HE systems. Not like a P-HE tamper-resistant database system, the insertion operation is entirely transparent, meaning any of digest computation, TEE trusted parameter combination, and TEE signing are no longer needed, which is more efficient and practical. Rather, in some embodiments, verification of the stored data and resultset may be conducted by adding "WITH SIGNATURE" keywords in the select statement, as discussed above. As such, the resultset may be signed or endorsed by the TEE, and may be verified at the client side, e.g., the user, which may guarantee data integrity of the retrieved resultset signed or endorsed by TEE, e.g., the data is not tampered with by an adversary. The endorsement of the signature may not only be used to verify tamper-resistant data in the temporal table, but may also be used for common queries in any general data table(s). It is appreciated that since the verification interface may be implemented or controlled by using the "WITH SIGNATURE" suffix keywords on select statements, the general selection performance by the select statement may not be affected.

FIG. 5 is a schematic structural diagram of an example computer system 500 applicable to implementing an electronic device (for example, the server or one of the terminal devices shown in FIG. 1), arranged in accordance with at least some embodiments described herein. It is to be understood that the computer system shown in FIG. 5 is provided for illustration only instead of limiting the functions and applications of the embodiments described herein.

As depicted, the computer system 500 may include a central processing unit (CPU) 505. The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display (LCD), a speaker, or the like; a storage device 540 including a hard disk or the like; and a communication device 545 including a network interface card such as a LAN card, a modem, or the like. The communication device 545 may perform communication processing via a network such as the Internet, fa WAN, a LAN, a LIN, a cloud, etc. In an embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowcharts and/or operations of FIGS. 3 and 4 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile or non-transitory memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for providing a tamper-resistant database management system, the method comprising: storing data in a temporal table in the database management system provided in a secure processing enclave, wherein the temporal table comprises a current table and a historical table for storing the data; assigning the stored data in both the current table and historical table, respectively, a unique number; and executing an operation provided in a database query language (DQL) statement for at least one of the stored data in the temporal table; wherein executing the operation comprises: locating the at least one of the stored data in at least one of the current table or the historical table based on the unique number; and executing the operation on the at least one of the stored data.

Aspect 2. The method according to Aspect 1, wherein the operation includes at least one of erase, select, fetch, or hide.

Aspect 3. The method according to any of Aspects 1-2, wherein access to and/or modification of the stored data in the temporal table is restricted to a designated user.

Aspect 4. The method according to any of Aspects 1-3, further comprising creating an audit table for recording any changes to the at least one of the stored data in the temporal table, wherein the recording of changes includes recording at least a value of the unique number and meta data associated with the changes to the at least one stored data.

Aspect 5. The method according to Aspect 4, wherein the meta data includes one or more of a type of the executed operation, executor of the operation, a number of rows that are subject the operation, or a timestamp.

Aspect 6. The method according to any of Aspects 1-5, wherein the unique number is a serial number that is assigned sequentially to the data stored in both the current table and the historical table.

Aspect 7. The method according to any of Aspects 1-6, wherein the historical table stores obsolete data and the current table stores current data.

Aspect 8. The method according to any of Aspect 3, wherein the access to and/or the modification of the stored data in the temporal table is performed by verifying a user as being the designated user, wherein the verifying includes verification of a signature.

Aspect 9. The method according to any of Aspects 1-8, wherein the DQL statement includes a "not greater than" predicate, the "not greater than" predicate being an erase operation.

Aspect 10. The method according to any of Aspects 1-9, wherein the DQL statement includes an "equal" predicate, the "equal" predicate being a hide operation.

Aspect 11. A non-transitory computer-readable medium having computer-executable instructions stored thereon that, upon execution, cause one or more processors to perform operations comprising: storing data in a temporal table in the database management system provided in a secure processing enclave, wherein the temporal table comprises a current table and a historical table for storing the data; assigning the stored data in both the current table and historical table, respectively, a unique number; and executing an operation provided in a database query language (DQL) statement for at least one of the stored data in the temporal table; wherein executing the operation comprises: locating the at least one of the stored data in at least one of the current table or the historical table based on the unique number; and executing the operation on the at least one of the stored data.

Aspect 12. The non-transitory computer-readable medium according to Aspect 11, wherein the operation includes at least one of erase, select, fetch, or hide.

Aspect 13. The non-transitory computer-readable medium according to any of Aspects 11-12, wherein the processor is further configured to perform an operation of creating an audit table for recording any changes to the at least one of the stored data in the temporal table, wherein the recording of changes includes recording at least a value of the unique number and meta data associated with the changes to the at least one stored data.

Aspect 14. The non-transitory computer-readable medium according to any of Aspects 11-13, wherein access to and/or modification of the data stored in the temporal table is restricted to a designated user.

Aspect 15. The non-transitory computer-readable medium according to any of Aspects 11-14, wherein the access to and/or the modification of the stored data in the temporal table is performed by verifying a user as being the designated user, wherein the verifying includes verification of a signature of the user.

Aspect 16. The non-transitory computer-readable medium according to any of Aspects 11-15, wherein the DQL statement includes a "not greater than" predicate, the "not greater than" predicate being an erase operation.

Aspect 17. The non-transitory computer-readable medium according to any of Aspects 11-16, wherein the DQL statement includes an "equal" predicate, the "equal" predicate being a hide operation.

Aspect 18. A tamper-resistant database management system comprising: a processor configured to execute instructions; a temporal table for storing data, wherein the temporal table comprises a current table and a historical table for storing the data, wherein both the current table and historical table include a unique number assigned to the stored data, respectively; wherein the processor is configured to execute the instructions, which when executed, cause the processor to: execute an operation provided in a database query language (DQL) statement for at least one of the stored data in the temporal table, wherein the executing the operation comprises: locating the at least one of the stored data in at least one of the current table or the historical table based on the unique number; and executing the operation on the at least one of the stored data, and wherein the tamper-resistant database management system is provided in a secure processing enclave.

Aspect 19. The database management system of Aspect 18, wherein the secure processing enclave further includes an audit table for recording any changes to the at least one of the stored data in the temporal table, wherein the audit table includes at least a value of the unique number and meta data associated with the changes to the at least one of the stored data.

Aspect 20. The database management system of any of Aspects 18-19, wherein access to and/or modification of the stored data in the temporal table is restricted to a designated user by verifying a signature of the designated user.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for providing a tamper-resistant database management system, the method comprising:
- storing data in a temporal table in the database management system provided in a secure processing enclave, wherein the temporal table comprises a current table and a historical table for storing the data;
- assigning the stored data in the current table a first unique number and assigning the stored data in the historical table a second unique number;
- recording the first unique number in an implicit column of the current table and the second unique number in an implicit column of the historical table; and
- executing an operation provided in a database query language (DQL) statement for at least one of the stored data in the temporal table;
- wherein executing the operation comprises:
  - using the first unique number or the second unique number as a unique searching key for targeted searching of the stored data in locating the at least one of the stored data in at least one of the current table or the historical table based on the first unique number or the second unique number; and
  - executing the operation on the at least one of the stored data.

2. The method according to claim 1, wherein the operation includes at least one of erase, select, fetch, or hide.

3. The method according to claim 1, wherein access to and/or modification of the stored data in the temporal table is restricted to a designated user.

4. The method according to claim 1, further comprising creating an audit table for recording any changes to the at least one of the stored data in the temporal table, wherein the recording of changes includes recording at least a value of the first unique number, the second unique number, and meta data associated with the changes to the at least one stored data.

5. The method according to claim 4, wherein the meta data includes one or more of a type of the executed operation, executor of the operation, a number of rows that are subject the operation, or a timestamp.

6. The method according to claim 1, wherein the first unique number and the second unique number are serial numbers that are assigned sequentially to the data stored in both the current table and the historical table.

7. The method according to claim 1, wherein the historical table stores obsolete data and the current table stores current data.

8. The method according to claim 3, wherein the access to and/or the modification of the stored data in the temporal table is performed by verifying a user as being the designated user, wherein the verifying includes verification of a signature.

9. The method according to claim 1, wherein the DQL statement includes a "not greater than" predicate, the "not greater than" predicate being an erase operation.

10. The method according to claim 1, wherein the DQL statement includes an "equal" predicate, the "equal" predicate being a hide operation.

11. A non-transitory computer-readable medium having computer-executable instructions stored thereon that, upon execution, cause one or more processors to perform operations comprising:
- storing data in a temporal table in a database management system provided in a secure processing enclave, wherein the temporal table comprises a current table and a historical table for storing the data;
- assigning the stored data in the current table a first unique number and assigning the stored data in the historical table a second unique number;
- recording the first unique number in an implicit column of the current table and the second unique number in an implicit column of the historical table; and
- executing an operation provided in a database query language (DQL) statement for at least one of the stored data in the temporal table;
- wherein executing the operation comprises:
  - using the first unique number or the second unique number as a unique searching key for targeted searching of the stored data in locating the at least one of the stored data in at least one of the current table or the historical table based on the first unique number or the second unique number; and
  - executing the operation on the at least one of the stored data.

12. The non-transitory computer-readable medium according to claim 11, wherein the operation includes at least one of erase, select, fetch, or hide.

13. The non-transitory computer-readable medium according to claim 11, wherein the processor is further configured to perform an operation of creating an audit table for recording of changes to the at least one of the stored data in the temporal table, wherein the recording any changes includes recording at least a value of the first unique number, the second unique number, and meta data associated with the changes to the at least one stored data.

14. The non-transitory computer-readable medium according to claim 11, wherein access to and/or modification of the data stored in the temporal table is restricted to a designated user.

15. The non-transitory computer-readable medium according to claim 14, wherein the access to and/or the modification of the stored data in the temporal table is performed by verifying a user as being the designated user, wherein the verifying includes verification of a signature of the user.

16. The non-transitory computer-readable medium according to claim 11, wherein the DQL statement includes a "not greater than" predicate, the "not greater than" predicate being an erase operation.

17. The non-transitory computer-readable medium according to claim 11, wherein the DQL statement includes an "equal" predicate, the "equal" predicate being a hide operation.

18. A tamper-resistant database management system comprising:
- a processor configured to execute instructions;
- a memory device comprising a temporal table for storing data, wherein the temporal table comprises a current table and a historical table for storing the data, wherein the stored data in the current table is assigned a first unique number and the stored data in the historical table is assigned a second unique number;

wherein the processor is configured to execute the instructions, which when executed, cause the processor to:

record the first unique number in an implicit column of the current table and the second unique number in an implicit column of the historical table;

execute an operation provided in a database query language (DQL) statement for at least one of the stored data in the temporal table, wherein the executing the operation comprises:

using the first unique number or the second unique number as a unique searching key for targeted searching of the stored data in locating the at least one of the stored data in at least one of the current table or the historical table based on the first unique number or the second unique number; and executing the operation on the at least one of the stored data, and wherein the tamper-resistant database management system is provided in a secure processing enclave.

19. The database management system of claim 18, wherein the secure processing enclave further includes an audit table for recording any changes to the at least one of the stored data in the temporal table, wherein the audit table includes at least a value of the first unique number, the second unique number, and meta data associated with the changes to the at least one of the stored data.

20. The database management system of claim 18, wherein access to and/or modification of the stored data in the temporal table is restricted to a designated user by verifying a signature of the designated user.

* * * * *